Figure 1:
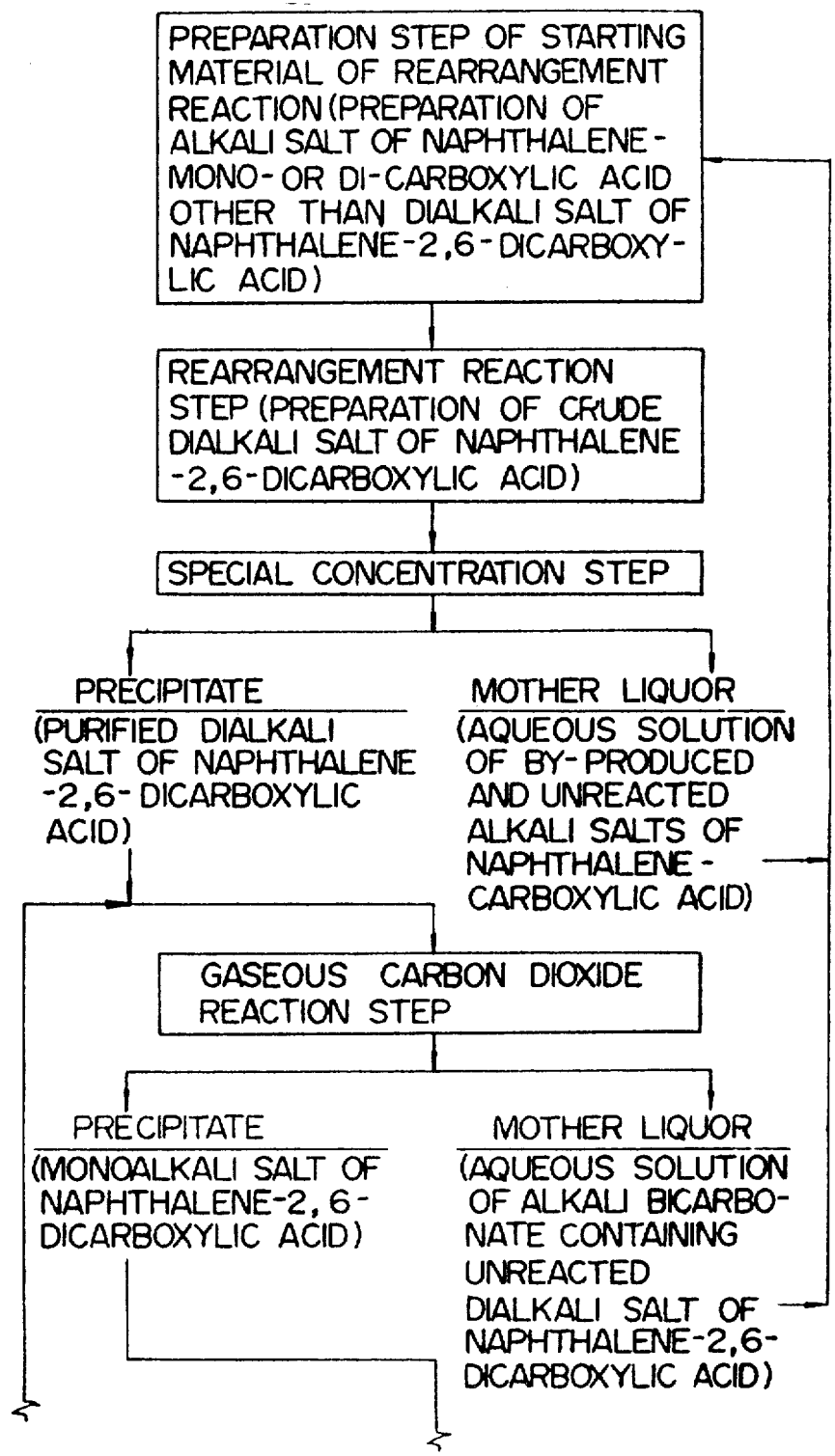
Figure 1:
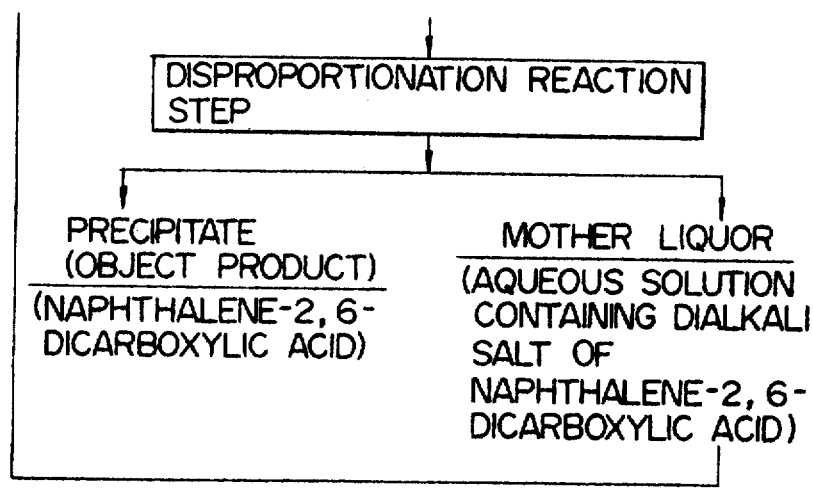

United States Patent

Ogata et al.

[15] 3,671,578

[45] June 20, 1972

[54] PROCESS FOR THE PREPARATION OF NAPHTHALENE-2,6-DICARBOXYLIC ACID

[72] Inventors: Kazuo Ogata; Kazuo Shimosato, both of Ehime-ken, Japan

[73] Assignee: Teijin Limited, Osaka, Japan

[22] Filed: Aug. 5, 1969

[21] Appl. No.: 847,682

[52] U.S. Cl. .................................. 260/515 P, 260/75 UA
[51] Int. Cl. ........................................... C07c 51/00
[58] Field of Search ............................... 260/575 P

[56] References Cited

UNITED STATES PATENTS 2,927,130   3/1960   Schutt ................................ 260/515

*Primary Examiner*—James A. Patten
*Attorney*—Sherman and Shalloway

[57] ABSTRACT

A process for the industrially advantageous preparation of high purity naphthalene-2,6-dicarboxylic acid which is particularly suitable as the material in the preparation of high quality polyalkylene 2,6-naphthalenedicarboxylate with good qualitative reproducibility. This process comprises heating a monoalkali salt of naphthalene-2,6-dicarboxylic acid in water or water-containing organic medium to cause its disproportionation into the corresponding free dicarboxylic acid and di-alkali salt thereof, and separating the precipitated free dicarboxylic acid.

4 Claims, 2 Drawing Figures

PROCESS FOR THE PREPARATION OF NAPHTHALENE-2,6-DICARBOXYLIC ACID

This invention relates to a process for the industrially advantageous preparation of high purity naphthalene-2,6-dicarboxylic acid which is particularly suitable as the material in the preparation of high quality polyalkylene 2,6-naphthalenedicarboxylate with good qualitative reproducibility. More particularly, the invention relates to a process for the preparation of naphthalene-2,6-dicarboxylic acid, which comprises heating a monoalkali salt of naphthalene-2,6-dicarboxylic acid in water or water-containing organic medium to cause its disproportionation into the corresponding free dicarboxylic acid and dialkali salt thereof, and separating the precipitated free dicarboxylic acid.

The invention also relates to a process for the preparation of high purity naphthalene-2,6-dicarboxylic acid, with remarkable industrial advantage and effectiveness, which furthermore comprises specific steps for preparing the monoalkali salt of naphthalene-2,6-dicarboxylic acid to be used as the starting material, the steps being conveniently combined with the main process. More particularly, the invention relates to a process for the preparation of high purity naphthalene-2,6-dicarboxylic acid comprising additionally combined steps whereby the dialkali salt of naphthalene-2,6-dicarboxylic acid by-produced in said disproportionation step is conveniently recycled to be used in the preparation step of starting monoalkali salt of naphthalene-2,6-dicarboxylic acid, to allow advantageous recovery and re-use of alkali.

Again the invention relates to a process for the preparation of high purity naphthalene-2,6-dicarboxylic acid, which is conveniently combined with auxiliary steps for making the starting monoalkali salt of naphthalene-2,6-dicarboxylic acid from naphthalene-mono- or di-carboxylic acids other than naphthalene-2,6-dicarboxylic acid.

It is known to react naphthalene-mono- or di-carboxylic acids other than naphthalene-2,6-dicarboxylic acid, such as naphthalene-$\alpha$-mono-carboxylic acid, naphthalene-$\beta$-monocarboxylic acid, naphthalene-1,8-dicarboxylic acid, etc., with hydroxides, carbonates, bicarbonates, etc., of alkali metals in an aqueous medium under heating, to produce the alkali salts thereof, such as alkali naththalene-$\beta$-monocarboxylate, alkali naphthalene-$\beta$-monocarboxylate, and dialkali naphthalene-1,8-dicarboxylate.

It is furthermore known to produce crude dialkali salt of naphthalene-2,6-dicarboxylic acid by heating thus obtained alkali naphthalene-$\alpha$-monocarboxylate (alkali 1-naphthoate), alkali naphthalene-$\beta$-monocarboxylate (alkali 2-naphthoate), or mixtures thereof at high temperatures in carbon dioxide or other inert gaseous atmosphere (German Patent No. 953,072) or by similarly heating dialkali naphthalene-1,8-dicarboxylate (German Patents Nos. 932,125 and 1,002,316). Such known reaction is hereinafter referred to as a rearrangement reaction.

It is also known to eliminate side products from the rearrangement reaction product, and to convert the dialkali salt of naphthalene-2,6-dicarboxylic acid in the form of free naphthalene-2,6-dicarboxylic acid. In the known method, the rearrangement reaction product which contains, besides the dialkali salt of naphthalene-2,6-dicarboxylic acid, such side products as dialkali salts of naphthalene mono- or di-carboxylic acid, naphthalene-2,3-dicarboxylic acid, is dissolved in water, and the water-insoluble matters are filtered off, Subsequently a mineral acid is added to the system to release naphthalenecarboxylic acids. The free acids recovered from the system by filtration are further boiled with an organic solvent which may be a lower aliphatic alcohol such as methanol or ethanol, or lower aliphatic carboxylic acid such as acetic acid, propionic acid, etc., so as to separate naphthalene-2,6-dicarboxylic acid which is insoluble in the organic solvent, from the free dicarboxylic acids which have been separated from the aforesaid unreacted products and side products upon addition of a mineral acid, and are soluble in the organic solvent.

The above-described conventional method is disadvantageous in that the side produced alkali salt of mineral acid (strong acid) cannot be directly re-used in the preparation of starting material for the rearrangement reaction, i.e., alkali salt of naphthalenecarboxylic acid. Furthermore, thus obtained object product, i.e., naphthalene-2,6-dicarboxylic acid, contains alkali salt of the mineral acid employed and naphthalene mono- or di-carboxylic acids other than naphthalene-2,6-dicarboxylic acid, and unless further subjected to complex and disadvantageous refining procedures, shows purity of approximately 98–97 percent which corresponds to optical density of approximately 0.20 in 1:1 aqueous NH$_4$OH solution at 400 m$\mu$. Such unsatisfactory purity renders the product unfit as the material for direct preparation of polyalkylene 2,6-naphthalenedicarboxylate having the recurring structural unit of the formula,

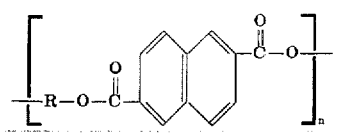

in which

R stands for alkylene residue of alkylene glycol, and $n$ is the number of recurring structural units in the polymer, which is prepared by reacting naphthalene-2,6-dicarboxylic acid with an alkylene glycol such as ethylene glycol, propylene glycol, etc.

Accordingly, the crude naphthalene-2,6-dicarboxylic acid obtained through the conventional method must be esterified with a lower aliphatic alcohol such a methanol or ethanol, to be first converted to an alkyl ester of naphthalene-2,6-dicarboxylic acid, and purified by such means as recrystallization, distillation, etc. Thus refined alkyl ester of naphthalene-2,6-dicarboxylic acid is either returned to the form of naphthalene-2,6-dicarboxylic acid to be used for the preparation of polyalkylene 2,6-naphthalenedicarboxylate, or subjected to an ester-interchange reaction with an alkylene glycol such as ethylene glycol, propylene glycol, etc., to form bis-hydroxyalkyl-2,6-naphthalenedicarboxylate, and which is subsequently polycondensed to form polyalkylene 2,6-naphthalenedicarboxylate.

We have engaged in laborous research works, aiming at the provision of a process for the preparation of high purity naphthalene-2,6-dicarboxylic acid suitable to be used in the preparation of high quality polyalkylene 2,6-naphthalenedicarboxylate with good qualitative reproducibility, which will enable the direct re-use of alkali in the alkali salt of starting naphthalenecarboxylic acid formed of the rearrangement reaction, and furthermore is free of the disadvantages inherent in the conventional preparation of naphthalene-2,6-dicarboxylic acid as above-described.

We first attempted to free naphthalene-2,6-dicarboxylic acid from the solution of dialkali salt of naphthalene-2,6-dicarboxylic acid, using the naphthalene-$\beta$-monocarboxylic acid which is employed for the preparation of said dialkali salt, by the procedure as expressed by the formula below:

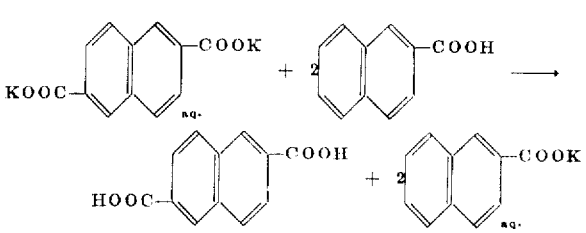

However, it is found as the result of experiments that from the dialkali salt of naphthalene-2,6-dicarboxylic acid, monoalkali salt of low solubility can be freed, but it is difficult to convert the free monoalkali salt of naphthalene-2,6-dicarboxylic acid to the corresponding free acid.

In the course of further researches, we discovered that the monoalkali salt of naphthalene-2,6-dicarboxylic acid is easily disproportionated when heated in water or water-containing organic solvent, to form the object free dicarboxylic acid and by-produced dialkali salt, and that the former acid is precipitated.

It is also discovered that the by-produced dialkali salt can be recycled for repetitive use in the preparation of starting monoalkali salt of naphthalene-2,6-dicarboxylic acid and thus naphthalene-2,6-dicarboxylic acid can be prepared with industrial advantage.

Accordingly, therefore, the object of the invention is to provide a process for the preparation of high purity naphthalene-2,6-dicarboxylic acid suitable to be used in the preparation of high quality polyalkylene 2,6-naphthalenedicarboxylate with good qualitative reproducibility, which enables the direct re-use of alkali, is free of disadvantages inherent in the conventional method as already described, and is industrially advantageous.

Many other objects and advantages will become clear from reading the following descriptions.

The disproportionation reaction of the invention can be expressed by the formula below, in which the case of potassium salt is shown by way of example, it being understood that sodium salt is equally useful.

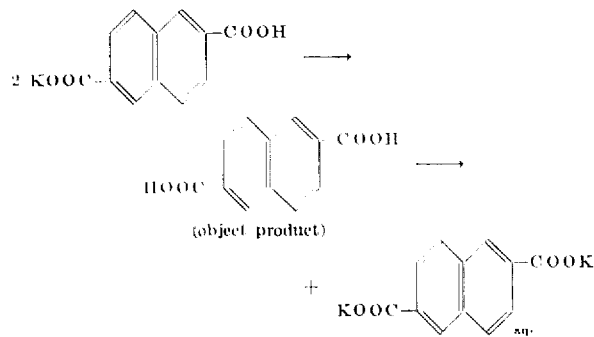

The above reaction is performed in water or in a water-containing organic medium, i.e., in the presence of water. The smooth progress of the reaction is affected by the concentration of monoalkali salt of naphthalene-2,6-dicarboxylic acid in water.

Incidentally, since monopotassium naphthalene-2,6-dicarboxylate is hardly soluble in water, above "concentration" referring to the above formula is expressed by the weight ratio of total monopotassium naphthalene-2,6-dicarboxylate inclusive of insoluble monopotassium naphthalene-2,6-dicarboxylate, to the total of water plus all the monopotassium naphthalene-2,6-dicarboxylate.

Said concentration is suitably selected according to the temperature and pressure conditions employed for the disproportionation reaction the lowest feasible concentration being preferred to promote the reaction rate. For example, when the disproportionation is performed at around 100° C. and atmospheric pressure, the reaction hardly progresses at the monoalkali salt concentration higher than 10 percent. Consequently, in that case it is desirable to employ a concentration not higher than 10 percent, particularly not higher than 8 percent. Preferred reaction temperature is not lower than 60° C., particularly not lower than 80° C. The reaction rate is accelerated under higher temperatures. At the boiling point, the reaction is complete within only 30 minutes. Atmospheric pressure is employable, but the reaction can be performed at elevated pressures and temperatures above 100° C. In such a case, the monoalkali salt concentration can be raised to higher than 10 percent.

Concurrent presence of naphthalene-2,6-dicarboxylic acid in the reaction system is in no way objectionable, but that of dialkali salt of naphthalene-2,6-dicarboxylic acid tends to interfere with the progress of the reaction. Therefore it is particularly desirable to operate to keep the dialkali salt concentration (to water) not higher than 5 percent. In order to achieve this, an effective means is to react the dialkali salt of naphthalene-2,6-dicarboxylic acid formed as the reaction progresses, under pressurized carbon dioxide gas to convert the salt again to the corresponding monoalkali salt. Whereby the monalkali salt concentration in the reaction system is increased.

Furthermore, it is also permissible to perform the reaction in a mixture of water with organic solvent, in order to dissolve the impurities which may be contained in the monoalkali naphthalene-2,6-dicarboxylate. When the reaction is conducted in a water-containing organic solvent in the above-described purpose, normally the suitable weight ratio of water to organic solvent ranges 1:0 to 1:1, although it is somewhat variable depending on the type of organic solvent, purity of the starting monoalkali salt, etc. As the organic solvent useful for such practice, for example, methanol and ethanol may be named.

In the subject process, the object naphthalene-2,6-dicarboxylic acid is precipitated from the reaction product, and consequently easily separated and recovered from the reaction system. The mother liquor containing dialkali naphthalenedicarboxylate can be recycled into the preparation step of starting monoalkali naphthalene-2,6-dicarboxylate, together with fresh dialkali naphthalene-2,6-dicarboxylate.

The preparation of said monoalkali dicarboxylate from the dialkali dicarboxylate can be conducted in the following manner. The dialkali salt is reacted with any of naphthalene-di- or monocarboxylic acids other than naphthalene-2,6-dicarboxylic acid, preferably the same naphthalenecarboxylic acid as employed in the preparation of starting material for the rearrangement reaction, for example, naphthalene-$\beta$-monocarboxylic acid, in an aqueous medium under heating, and the resulting precipitate is recovered by filtration. In that procedure, the side product, for example, monoalkali naphthalene-$\beta$-monocarboxylate, can be recovered by concentrating to dryness the mother liquor from which the precipitate has been recovered, and subjecting the same to already described rearrangement reaction to form dialkali naphthalene-2,6-dicarboxylate.

Thus, within the scope of subject process comprising heating a monoalkali salt of naphthalene-2,6-dicarboxylic acid in water or water-containing organic solvent to cause disproportionation thereof into (A) naphthalene-2,6-dicarboxylic acid which is the object product, and (B) dialkali salt of naphthalene-2,6-dicarboxylic acid which is the side product, and separating the whereupon precipitated naphthalene-2,6-dicarboxylic acid from the mother liquor, an embodiment is provided in which the said monoalkali salt is the product precipitated upon addition of a naphthalene-di- or monocarboxylic acid other than naphthalene-2,6-dicarboxylic acid to an aqueous solution of dialkali naphthalene-2,6-dicarboxylate, and the foregoing nother liquor containing the side product (B), i.e., dialkali salt of naphthalene-2,6-dicarboxylic acid, is recycled into such precipitation reaction system. Furthermore, as another modification of the subject process, an embodiment similar to the foregoing is provided,in which the mother liquor obtained of said precipitation reaction system from which the precipitate has been removed, is concentrated to dryness, and thus obtained alkali salt of naphthalene-di- or monocarboxylic acid other than naphthalene-2,6-dicarboxylic acid is re-used as the starting material of known rearrangement reaction.

An example of the foregoing embodiments can be illustrated as follows:

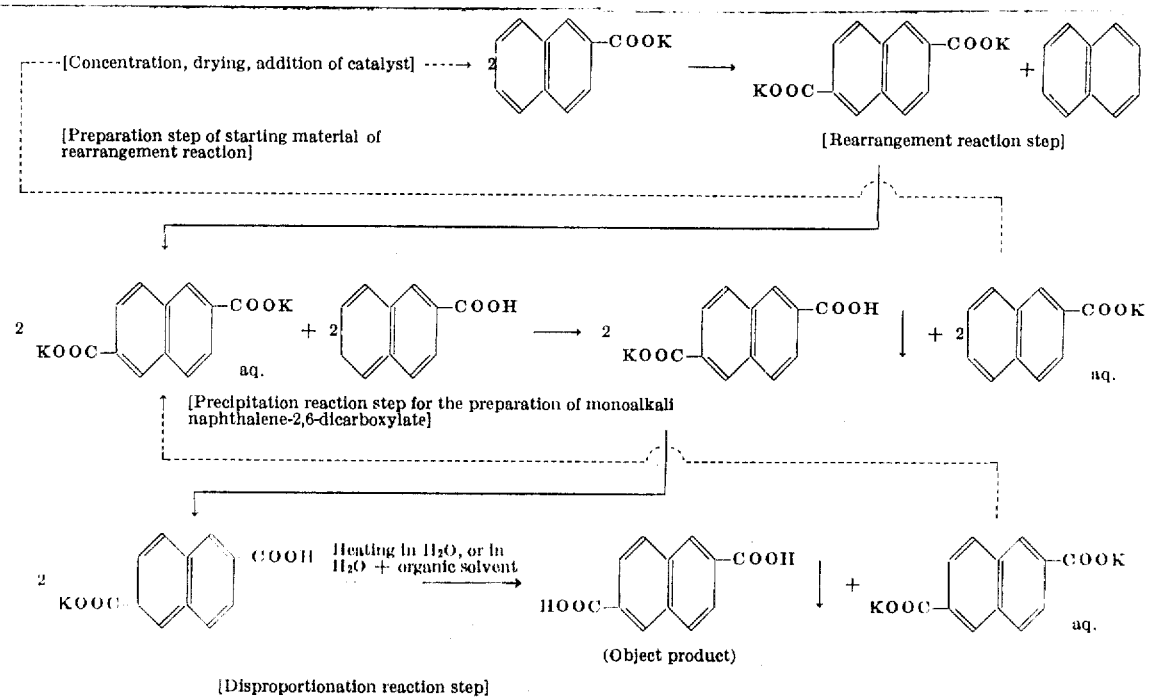

[Disproportionation reaction step]

In the above formulas, aq. means aqueous solution, and ↓ means that the product is precipitated and settled.

In the precipitation reaction step for making monoalkali naphthalene-2,6-dicarboxylate, suitable concentration of the dialkali salt of naphthalene-2,6-dicarboxylic acid to water is not higher than 20 weight percent, preferably approximately 10 weight percent. It is desirable to use not less than equimolar amount, but not more than 1.5 molar times of naphthalene-monocarboxylic acid to the dialkali salt of naphthalene-2,6-dicarboxylic acid, and to conduct the reaction at temperatures not lower than 90° C., and at atmospheric pressure, for at least 30 minutes. If desired, higher temperatures and pressures may be employed, with the reaction time suitably shortened.

According to the subject process, the starting monoalkali salt of naphthalene-2,6-dicarboxylic acid can be conveniently prepared by the following reaction in carbon dioxide gas atmosphere, as an alternative to above-described precipitation reaction step.

Gaseous carbon dioxide is introduced into the aqueous solution of dialkali salt of naphthalene-2,6-dicarboxylic acid. In the course of resulting reaction, the monoalkali salt is formed, and precipitated as separated from the reaction product system. Thus the monoalkali salt can be easily isolated and recovered. Hereinafter this step will be referred to as carbon dioxide reaction step.

Since the mother liquor from which the precipitate has been removed is an aqueous solution containing alkali bicarbonate, it can be utilized for the preparation of starting material of rearrangement reaction as follows: a naphthalene-di- or monocarboxylic acid other than naphthalene-2,6-dicarboxylic acid, preferably the same naphthalenecarboxylic acid as that employed for the initial preparation of starting material for rearrangement reaction, is added to the aqueous solution and concentrated to dryness under heating. Thus dried product serves as the starting material of rearrangement reaction.

Thus, within the scope of subjected process, another modification is provided in which the starting monoalkali salt of naphthalene-2,6-dicarboxylic acid is the precipitation product formed upon introduction of gaseous carbon dioxide into aqueous solution of dialkali salt of naphthalene-2,6-dicarboxylic acid, and the mother liquor containing the side product (B) of the disproportionation, i.e., dialkali salt of naphthalene2,6-dicarboxylic acid, is recycled into above carbon dioxide gas reaction step. Furthermore, if necessary, a naphthalene-di- or monocarboxylic acid other than naphthalene-2,6-dicarboxylic acid is added to the mother liquor obtained of the carbon dioxide gas reaction step from which the precipitation product has been removed, and the system is heated and concentrated to an alkali salt of naphthalene di-or monocarboxylic acid other than naphthalene-2,6-dicarboxylic acid, to be re-used as the starting material of rearrangement reaction.

It is again possible to recycle the gaseous carbon dioxide by-produced in the above preparation step of the starting material of rearrangement reaction into the carbon dioxide gas reaction step, to effect advantageous utilization of alkali source and carbon dioxide source.

An example of the above embodiment can be illustrated by a diagram in the similar manner to the first, in which dipotassium salt of naphthalene-1,8-dicarboxylic acid is used as the starting material of the rearrangement reaction.

The suitable operational conditions of the gaseous carbon dioxide reaction step for the preparation of the monoalkali salt of naphthalene-2,6-dicarboxylic acid are as follows: the concentration of dialkali salt of naphthalene-2,6-dicarboxylic acid to water may range 5–30 weight percent (the dialkali salt may be partly suspended), preferably 15–20 weight percent; and gaseous carbon dioxide is introduced into the system at temperatures not higher than 70° C., particularly at 0°–40° C., under atmospheric or slightly elevated pressure. In a particularly preferred practice, the gaseous carbon dioxide is introduced into the reactor from a lower portion on said reactor, in such a manner that fine carbon dioxide bubbles should be dispersed in the liquid system, while such is not an essential requirement. The reaction is continued until the gaseous carbon dioxide absorption becomes no further observable. The reaction time varies depending on the manner of gaseous carbon dioxide introduction, intensity of agitation, reaction temperature, etc., but normally the continuous introduction of 60–120 minutes substantially completes the reaction. Thus precipitated monoalkali salt of naphthalene-2,6 -dicarboxylic acid is separated by filtration, while the reaction product is maintained at the temperature not higher than 70° C.

When the above gaseous carbon dioxide reaction step is utilized for the preparation of starting monoalkali salt of naphthalene-2,6-dicarboxylic acid, the crude dialkali salt of naphthalene-2,6-dicarboxylic acid obtained from the already mentioned known rearrangement reaction can be recycled as

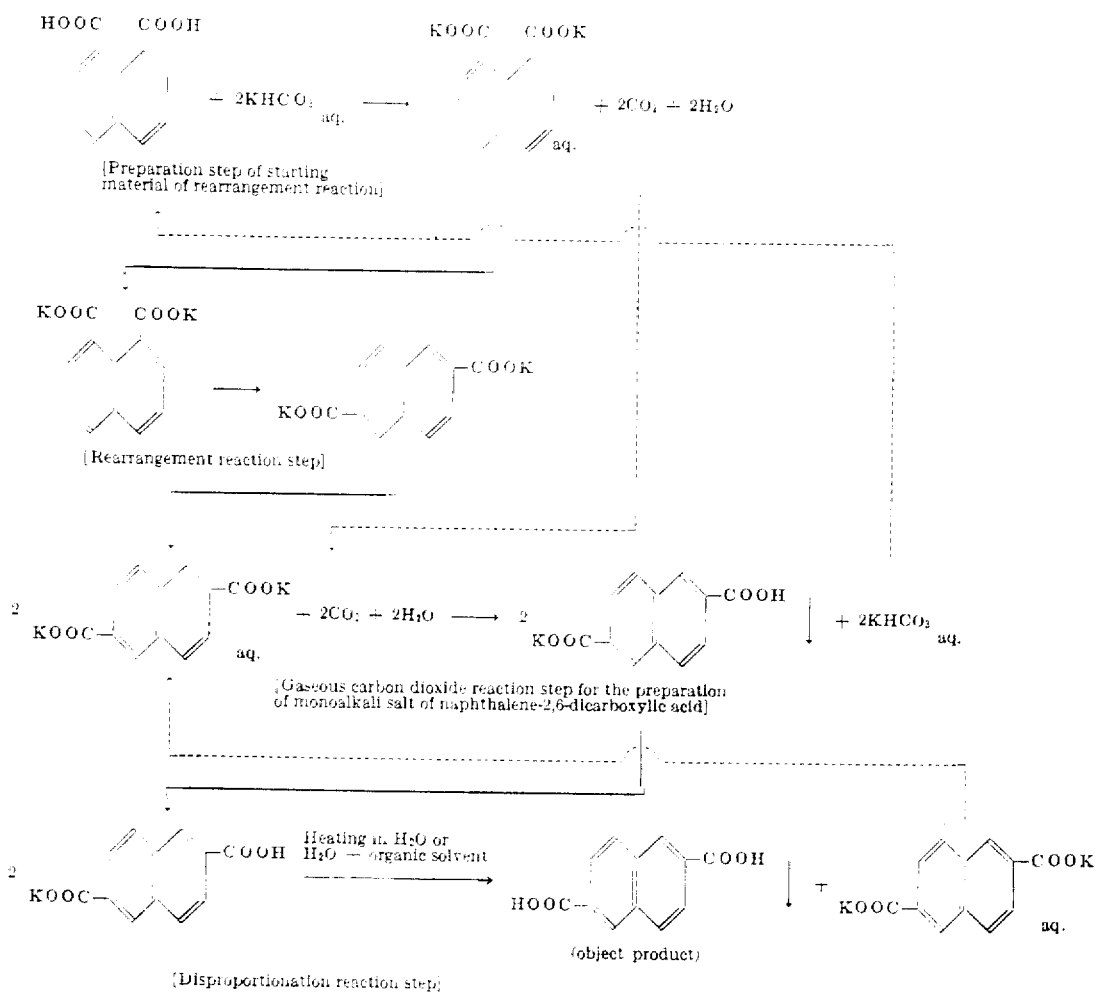

the starting material of the gaseous carbon dioxide reaction step, after being purified by special concentration step or mixture concentration step. Whereupon a very convenient combination of all steps and full utilization of side products are accomplished, and high purity naphthalene-2,6-dicarboxylic acid particularly fitted for the preparation of high quality polyalkylene 2,6-naphthalenedicarboxylate can be prepared with remarkable industrial advantages.

First the above "special concentration step" will be explained.

Alkali salt of any naphthalene-mono- or di-carboxylic acid other than dialkali salt of naphthalene-2,6-dicarboxylic acid is heated in pressurized atmosphere of gaseous carbon dioxide or other inert gas, at high temperatures, preferably ranging 350°–450° C., for 2–3 hours, in the presence of a known catalyst (preferably cadmium iodide). The resulting rearrangement reaction product is dissolved in water or warm water to be removed of insoluble matters such as carbide and catalyst by filtration. The filtrate may be treated with active carbon to be removed of coloring matter, if necessary, and thereafter concentrated by a degree of concentration within the later-specified range, to cause precipitation of alkali salt of naphthalene-2,6-dicarboxylic acid. Whereby high purity dialkali naphthalene-2,6-dicarboxylate alone can be effectively separated and recovered, while leaving substantially all the by-produced and unreacted alkali salts of naphthalenecarboxylic acid as dissolved in the mother liquor (amounting to approximately 5–10 weight percent in the rearrangement reaction product).

The term, "degree of concentration", in the above is defined by the equation below:

$$\text{Degree of concentration} = \frac{\text{Total weight of cake (precipitate) in the solution}}{\text{Total weight of solution}} \times 100(\%)$$

By way of demonstration, crude dipotassium naphthalene-2,6-dicarboxylate obtained from above-described rearrangement reaction was dissolved in water, and from which carbide and catalyst were removed by filtration. The filtrate was concentrated to various degrees of concentration as indicated in Table 1 below, and all the concentrates were cooled to room temperature. The yield (weight percent) of dipotassium naphthalene-2,6-dicarboxylate whereupon precipitated, to the total dipotassium naphthalene-2,6-dicarboxylate present in the system, and purity of the precipitate from each concentrate, were as given also in Table 1.

TABLE 1

| Degree of Concentration (%) | Precipitation Yield (%) | Purity (%) |
|---|---|---|
| 40 | 57 | 99.7 |
| 50 | 70 | 99.6 |
| 60 | 81 | 99.4 |
| 75 | 91 | 96.0 |

From the results shown in the above Table 1, it can be understood that, when the rearrangement reaction product is crude dipotassium naphthalene-2,6-dicarboxylate, it is conveniently concentrated by a degree of concentration ranging 50–60 percent, after having been dissolved in water and removed of carbide and catalyst by filtration. Within said range of concentration degree, the greatest part of dipotassium naphthalene-2,6-dicarboxylate present in the system is precipitated, and substantially all the by-produced or unreacted potassium salts of naphthalenedicarboxylic acids other than dipotassium naphthalene-2,6-dicarboxylate, which are present in the rearrangement reaction product in an amount ranging 5–10 weight percent, remain in the solution. Thus, high purity dipotassium naphthalene-2,6-dicarboxylate can be effectively separated and recovered.

If the concentration is advanced beyond 60 percent, at least a portion of potassium naphthalenecarboxylates other than dipotassium naphthalene-2,6-dicarboxylate is also precipitated, to impair the purity of dipotassium naphthalene-2,6-dicarboxylate cake and make the product unfit for the object of this invention. Also when the degree of concentration is below 50 percent, appreciable amount of the dipotassium salt remains in the mother liquor after separation of the precipitate, to remarkably impair the yield of the precipitate.

Similarly to the above, the correlation of the degree of concentration versus the precipitation yield and purity of dialkali salt can be empirically determined as to other alkali salts, and the optimum range of concentration can be selected. That is, the range of concentration within which the yield (precipitation yield) of dialkali salt precipitated from the aqueous solution of aforesaid rearrangement reaction product from which insoluble matters such as carbide and catalyst have been removed, when the solution is cooled to room temperature, to the total weight of dialkali salt of naphthalene-2,6-dicarboxylic acid present in the solution, becomes less than 100 percent but not less than 70 percent, and the purity of said precipitate exceeds 97 percent, can be easily determined from advance series of experiments as above.

Thus, still another modification of the subject process which comprises heating a monoalkali salt of naphthalene-2,6-dicarboxylic acid in water or water-containing organic solvent, to cause disproportionation thereof into (A) naphthalene-2,6-dicarboxylic acid which is the object product and (B) dialkali salt of naphthalene-2,6-dicarboxylic acid which is the side product, and separating the precipitated naphthalene-2,6-dicarboxylic acid from the mother liquor, is provided, in which said monoalkali salt of naphthalene-2,6-dicarboxylic acid is prepared by the steps of dissolving a rearrangement product containing dialkali salt of naphthalene-2,6-dicarboxylic acid, obtained from known rearrangement reaction, in water or warm water; removing insoluble matters therefrom by filtration; concentrating the solution preferably by such a degree of concentration at which the precipitation yield of the dialkali salt precipitated when the solution is cooled to room temperature reaches at least 70 percent by weight, and the purity of said precipitated dialkali salt exceeds 97 percent; forming an aqueous solution of the precipitate; introducing gaseous carbon dioxide thereinto and recovering the precipitated monoalkali salt of naphthalene-2,6-dicarboxylic acid: and also in which the aforesaid mother liquor containing the side product (B), dialkali salt of naphthalene-2,6-dicarboxylic acid, is recycled into the above carbon dioxide reaction step.

Now the aforesaid special mixture concentration step will be explained.

In said step, to the similar aqueous solution of rearrangement reaction product from which the insoluble matters such as carbide, catalyst, etc. have been removed, alkali carbonate or bicarbonate, for example, potassium carbonate, sodium carbonate, potassium bicarbonate, sodium bicarbonate, etc., preferably the carbonate or bicarbonate of same alkali employed in the dialkali salt of naphthalene-2,6-dicarboxylic acid formed in the rearrangement reaction, is added, and the mixture is concentrated by a degree of concentration at which the precipitation yield of dialkali salt of the naphthalene-2,6-dicarboxylic acid precipitated when the concentrate is cooled to room temperature reaches at least 70 weight percent and purity of the precipitated dialkali salt exceeds 97 percent. Recovering the precipitate, high purity dialkali salt of naphthalene-2,6-dicarboxylic acid can be effectively separated at high yield, while leaving substantially all the unreacted and by-produced alkali salts of naphthalenecarboxylic acid contained in the rearrangement reaction product in an amount of approximately 5–10 weight percent, in the mother liquor as dissolved therein.

As the alkali carbonate or bicarbonate, a part or all of the mother liquor obtained of the following reaction step of aqueous solution of dialkali naphthalene-2,6-dicarboxylate under introduction of gaseous carbon dioxide, from which the precipitated monoalkali naphthalene-2,6-dicarboxylate has been removed, is conveniently used by recirculation.

By way of experimentation, as to a case wherein the crude dialkali salt of naphthalene-2,6-dicarboxylic acid, i.e. the rearrangement reaction product, was potassium salt, and the alkali carbonate added was potassium carbonate, potassium carbonate was added to the aqueous solution of the rearrangement reaction product from which carbide, catalyst, etc. had been removed by filtration, at various concentrations, and as to each mixture the amounts of dipotassium naphthalene-2,6-dicarboxylate and impurities (mainly potassium 2-naphthoate) dissolved in the aqueous potassium carbonate solution (number of grams thereof present in 100 g of said solution as dissolved in the latter) at various temperatures were measured. The results were as given in Table 2 below.

From the above Table 2, it can be understood that, when the aqueous solution containing crude dipotassium naphthalene-2,6-dicarboxylate formed of the rearrangement reaction and potassium carbonate is concentrated, concentrations of the solutes are increased to finally cause precipitation of dipotassium naphthalene-2,6-dicarboxylate, and that particularly around 80° C., the difference in solubilities of dipotassium naphthalene-2,6-dicarboxylate and the impurities is great. Thus it can be understood that, when the mixture solution is concentrated until alkali carbonate concentration of empirically predetermined value is obtained, the greatest part of dipotassium naphthalene-2,6-dicarboxylate can be precipitated while leaving the greatest part of impurities as dissolved in the mother liquor. Thus, it is possible to obtain high purity dipotassium naphthalene-2,6-dicarboxylate of very little coloring impurities content, since substantially all the un-

TABLE 2

| | Temperature (° C.) | | | | | |
|---|---|---|---|---|---|---|
| | 35 | | 60 | | 80 | |
| Solute | Dipotassium naphthalene-2,6-dicarboxylate | Potassium 2-naphthoate | Dipotassium naphthalene-2,6-dicarboxylate | Potassium 2-naphthoate | Dipotassium naphthalene-2,6-dicarboxylate | Potassium 2-naphthoate |
| $K_2CO_3$ (wt. percent): | | | | | | |
| 0 | 33 | 86 | 35 | 100 | 38 | 117 |
| 13.2 | 9 | 23 | 11 | 55 | 13 | 80 |
| 19.4 | 4 | 6 | 6 | 35 | 7 | 60 |
| 31.1 | Nil | Nil | Nil | Nil | 1 | 19 | desirable impurities such as by-produced acid alkali salt, coloring matters etc. are effectively left in the mother liquor.

Optimum alkali carbonate or bicarbonate concentration in the aqueous solution, degree of concentration and precipitation temperatures as to alkali salts other than potassium salt can also be easily selected, by empirically determining in advance the correlation of solubilities of dialkali salts of naphthalene-2,6-dicarboxylic acid and of impurities, with the concentration of alkali carbonate or bicarbonate to be added, at various temperatures.

Thus, there is provided still another modification of the subject process which comprises heating a monoalkali salt of naphthalene-2,6-dicarboxylic acid in water or water-containing organic solvent, to cause disproportionation thereof into (A) naphthalene-2,6-dicarboxylic acid which is the object product, and (B) dialkali salt of naphthalene-2,6-dicarboxylic acid which is the side product, and separating the precipitated naphthalene-2,6-dicarboxylic acid from mother liquor, the characteristic features residing in that the monoalkali salt of naphthalene-2,6-dicarboxylic acid is prepared by the steps of dissolving a rearrangement reaction product, which contains dialkali salt of naphthalene-2,6-dicarboxylic acid obtained of known rearrangement reaction, in water or warm water; removing insoluble matters therefrom by filtration; adding to the solution alkali carbonate or bicarbonate; concentrating the system; dissolving the resulting precipitate in water; introducing gaseous carbon dioxide into so formed aqueous solution; and recovering the resulting precipitate: and in that the mother liquor containing the aforesaid side product (B), dialkali salt of naphthalene-2,6-dicarboxylic acid, is recycled to the above gaseous carbon dioxide step.

In accordance with the invention, the above-described special concentration or mixture concentration step can be utilized for removing impurities from the rearrangement reaction product, and the mother liquor obtained of the concentration step and that obtained of the gaseous carbon dioxide step, from which the respective precipitate has been removed, can be conveniently recycled. Thus industrially advantageous, effective combination of individual steps is completed. Hereinafter typical embodiments of the subject process will be explained with reference to the attached drawings.

Figure 2:
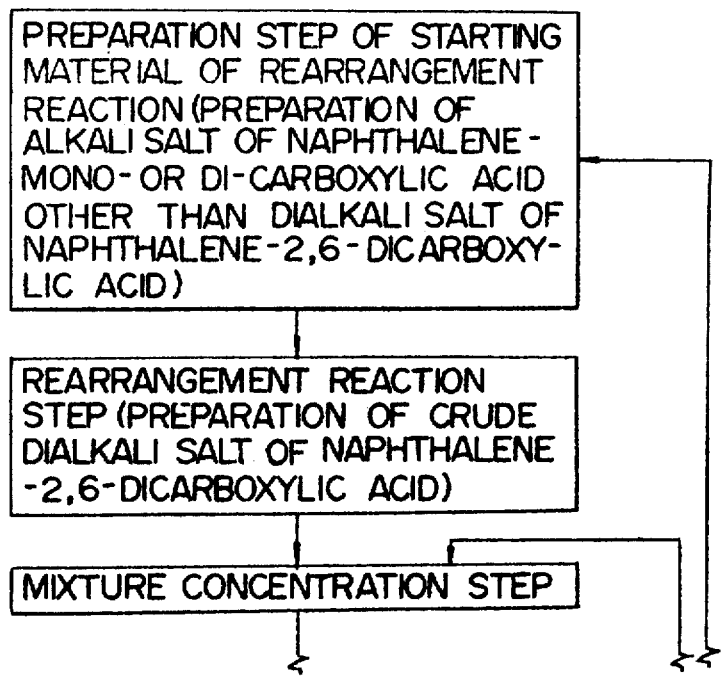
Figure 2:
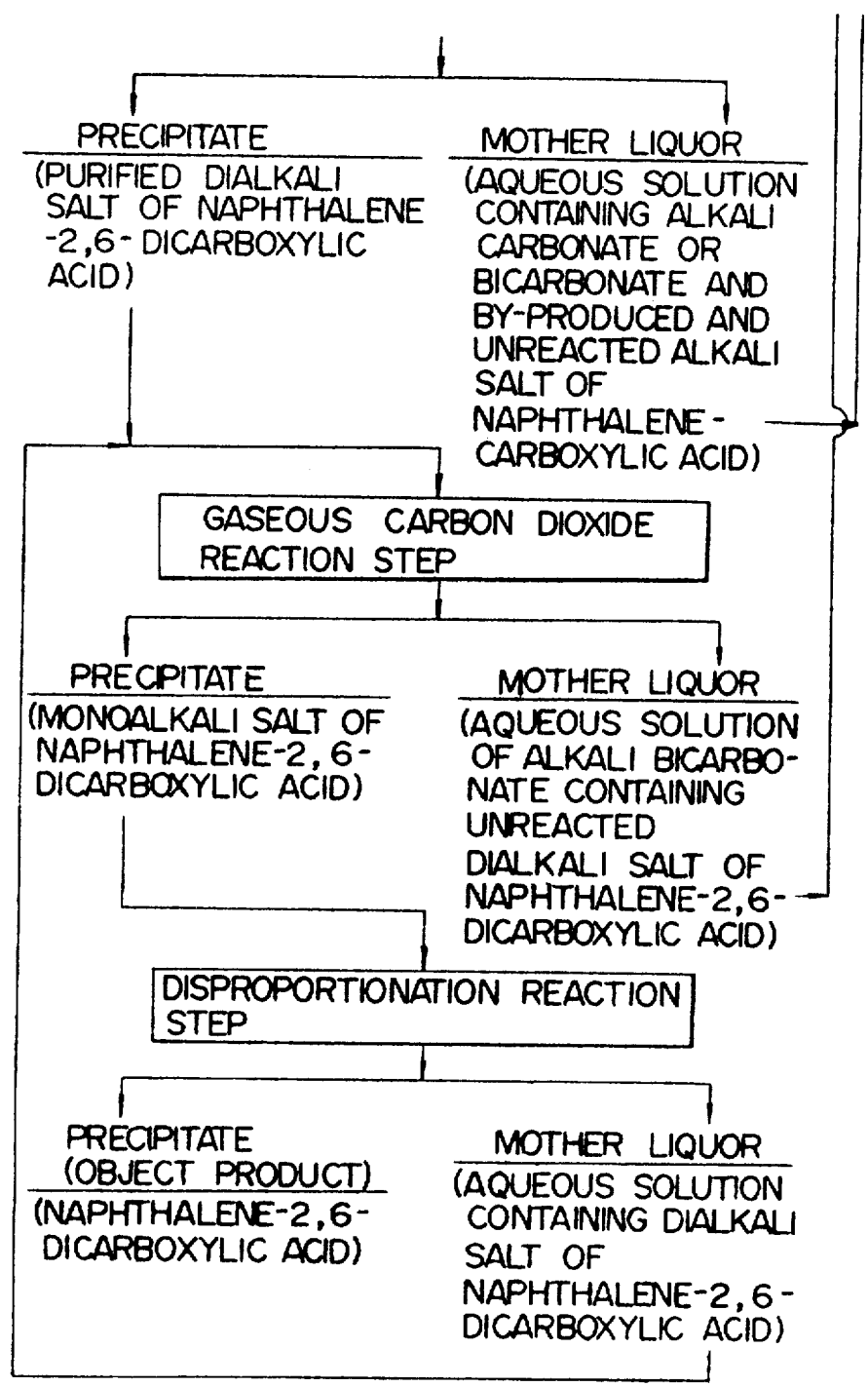

FIG. 1 is a flow chart showing the combination of steps suitable for practicing the subject process, and FIG. 2 is another flow chart showing a different manner combination.

Referring to FIG. 1, the alkali salt of naphthalene-mono-or dicarboxylic acid other than dialkali salt of naphthalene-2,6-dicarboxylic acid, such as an alkali salt of naphthalene-α-monocarboxylic acid, naphthalene-β-monocarboxylic acid, or naphthalene-1,8-dicarboxylic acid, which is obtained in the preparation step of starting material for known rearrangement reaction, is subjected to the already described known rearrangement reaction, and the product is dissolved in water or warm water so that the insoluble matters such as carbide and catalyst may be removed therefrom by filtration. Then the aqueous solution is concentrated to a predetermined degree in the special concentration step as described in the foregoing. The precipitate, which is a purified dialkali salt of naphthalene-2,6-dicarboxylic acid, is fed to the gaseous carbon dioxide reaction step. The remaining mother liquor is an aqueous solution of mainly alkali salt of naphthalenecarboxylic acid by-produced of, and unreacted in, the rearrangement reaction.

On the other hand, the monoalkali salt of naphthalene-2,6-dicarboxylic acid precipitated in the gaseous carbon dioxide reaction step is transferred to the aforesaid disproportionation reaction step. The remaining mother liquor is an aqueous solution of alkali bicarbonate, containing a minor amount of dialkali salt of naphthalene-2,6-dicarboxylic acid which remained unreacted in the reaction with gaseous carbon dioxide.

The above two mother liquors are combined, added with the naphthalene-mono- or di-carboxylic acid other than naphthalene-2,6-dicarboxylic acid, which is used for the preparation of starting material for the rearrangement reaction, and a rearrangement reaction catalyst, concentrated to dryness under heating, and recycled into the rearrangement reaction step.

Furthermore, the object product, naphthalene-2,6-dicarboxylic acid formed and precipitated in the disproportionation step may be washed with a minor amount of hot water, if necessary. Thus washed cake is dried to provide a high purity product. Whereas, the remaining mother liquor, which is an aqueous solution containing dialkali salt of naphthalene-2,6-dicarboxylic acid, may be combined with above washing, and is used for dissolving the precipitate obtained of the special concentration step, to be recycled into the gaseous carbon dioxide step.

Thus, in accordance with the present invention, a process for the preparation of naphthalene-2,6-dicarboxylic acid is provided, which comprises known rearrangement reaction step in which an alkali salt of naphthalene-mono- or di-carboxylic acid other than dialkali salt of naphthalene-2,6-dicarboxylic acid is heated to high temperatures in pressurized atmosphere of gaseous carbon dioxide or other inert gas; dissolving the so obtained crude dialkali salt of naphthalene-2,6-dicarboxylic acid in water or warm water; removing the insoluble matters therefrom by filtration; concentration step in which the filtrate is concentrated by such a degree at which the precipitation yield of the dialkali salt precipitated when the concentrated liquid is cooled to room temperature reaches at least 70 percent and the purity of said precipitate exceeds 97 percent; separating the precipitate from the concentrated liquid; carbon dioxide reaction step in which gaseous carbon dioxide is introduced into the aqueous solution of said precipitate to form and precipitate monoalkali salt of naphthalene-2,6-dicarboxylic acid; separating the precipitate and heating the same in water or water-containing organic solvent to cause disproportionation thereof into (A) naphthalene-2,6-dicarboxylic acid which is the object product, and (B) dialkali salt of naphthalene-2,6-dicarboxylic acid which is the side product; recovering the precipitated naphthalene-2,6-dicarboxylic acid from the mother liquor; recycling the mother liquor containing the side product (B), dialkali salt of naphthalene-2,6-dicarboxylic acid, into the carbon dioxide reaction step; and combining the mother liquor obtained of the concentration step from which the precipitate has been removed and that obtained of the carbon dioxide reaction step from which the precipitate has been removed, and recycling the same to the preparation step of starting material for the rearrangement reaction.

In the process illustrated in FIG. 2, the special concentration step in the process of FIG. 1 is replaced by the already described mixture concentration step, and consequently the manner of recycling of two types of mother liquors which are utilized for the preparation of starting material for the rearrangement reaction in the process of FIG. 1 is somewhat different.

In the latter example, the mother liquor remaining after the precipitate is removed from the concentrated liquid containing the rearrangement reaction product is added with a naphthalene-mono- or di-carboxylic acid other than naphthalene-2,6-dicarboxylic acid and rearrangement reaction catalyst, concentrated to dryness under heating, and recycled for the preparation of starting material of the rearrangement reaction, similarly to the case of FIG. 1. On the other hand, the mother liquor obtained of the carbon dioxide reaction step from which the precipitate has been removed is recycled into the mixture concentration step.

The present process is free from the many disadvantages which are inherent in the conventional process as already described, and high purity and high quality naphthalene-2,6-dicarboxylic acid suitable to be directly polycondensed with an alkylene glycol such as ethylene glycol, propylene glycol, etc., to form high quality polyalkylene 2,6-naphthalenedicarboxylate, can be produced with industrial advantage. Also the alkali source can be advantageously recycled and re-used in the subject process.

In accordance with the present invention, particularly high purity and high quality naphthalene-2,6-dicarboxylic acid, i.e., purity of no lower than 99 percent, and the optical density of its 1:1 aqueous ammonia solution at 400 m$\mu$(OD. 400 m$\mu$) of not higher than 0.002, can be prepared at high yield with good reproducibility as to quality and purity, by the use of monoalkali salt obtained of the carbon dioxide reaction step, inter alia, the monoalkali salt obtained by subjecting the dialkali salt of naphthalene-2,6-dicarboxylic acid obtained through the mixture concentration step or special concentration step to the carbon dioxide reaction step, as the starting monoalkali salt of naphthalene-2,6-dicarboxylic acid.

Hereinafter several embodiments for practicing the subject process will be explained, referring to the working examples.

EXAMPLE 1

Gaseous carbon dioxide was passed through 200 g of 15 percent aqueous solution of dipotassium naphthalene-2,6-dicarboxylate at room temperature, and 18 g of precipitate was obtained. The acid value of the precipitate was 219. (The acid value of monopotassium naphthalene-2,6-dicarboxylate is 220.) As the result of infrared spectrum analysis and potassium analysis, the precipitate was identified to be pure monopotassium naphthalene-2,6-dicarboxylate. The yield was 67 percent. The remaining solution could be further concentrated, and upon passing gaseous carbon dioxide therethrough, more monopotassium salt was recovered.

5.08 Grams of the monopotassium naphthalene-2,6-dicarboxylate was suspended in water, stirred at boiling point for 120 minutes, filtered, and the recovered precipitate was washed with a minor amount of water. Thus 2.14 g of a solid was obtained, which had an acid value of 520. (The acid value of naphthalene-2,6-dicarboxylic acid is 518.) The infrared spectrum analysis thereof confirmed that the solid was pure naphthalene-2,6-dicarboxylic acid. The yield to the starting monopotassium naphthalene-2,6-dicarboxylate was 99 percent.

The filtrate contained 2.94 g of dipotassium naphthalene-2,6-dicarboxylate. The filtrate was condensed to a concentration of 15 percent, and again reacted with gaseous carbon dioxide to produce 1.78 g of monopotassium naphthalene-2,6-dicarboxylate.

EXAMPLE 2

The crude reaction product obtained of rearrangement of potassium $\beta$-naphthoate to dipotassium naphthalene-2,6-dicarboxylate under heating was dissolved in water, filtered, and purified to be decolorized. Thus 220 g of clear 20 percent aqueous solution of dipotassium naphthalene-2,6-dicarboxylate was obtained. 25.4 grams of $\beta$-naphthoic acid was added to the solution, and reacted at boiling point for 2 hours. Thus obtained 38.2 g of the precipitate had an acid value of 222, which was identified to be substantially pure monopotassium naphthalene-2,6-dicarboxylate, as the result of infrared spectrum analysis. The yield was quantitative.

5.08 grams of the monopotassium naphthalene-2,6-dicarboxylate was suspended in 95 g of water, and reacted at 80° C. for 120 minutes under stirring. Thus formed precipitate was recovered by filtration, and washed -dicarboxylate. The yield was 80 percent.

with a minor amount of water. Thus recovered 2.72 g of the precipitate had an acid value of 398. From the acid value and result of infrared spectrum analysis, the precipitate contained 60 percent of naphthalene-2,6-dicarboxylic acid, and 40 percent of monopotassium naphthalene-2,6-dicarboxylate.

EXAMPLE 3

The monopotassium naphthalene-2,6-dicarboxylate obtained through similar operation as described in Example 1 was used as the starting material.

Each 10.16 g of the monopotassium naphthalene-2,6-dicarboxylate was formed into aqueous suspension of each 5, 7, and 9 percent concentration. The suspensions were reacted at boiling point for an hour under stirring, and resulting precipitates were cooled and filtered. The results of infrared spectrum analysis and acid values of the precipitates were as given in Table 3 below.

TABLE 3

| Concentration (wt. percent) | Weight of precipitate (g.) | Acid value | Composition (wt. percent) | | Yield (percent) |
| | | | Naphthalene-2,6-dicarboxylic acid | Monopotassium naphthalene-2,6-dicarboxylate | |
| --- | --- | --- | --- | --- | --- |
| 5 | 4.28 | 522 | 100 | 0 | 99 |
| 7 | 4.80 | 450 | 86.1 | 13.9 | 86 |
| 9 | 6.14 | 348 | 61.0 | 39.0 | 61 |

EXAMPLE 4

(An example in accordance with the flow chart of FIG. 1)

10 kg of a mixture of potassium 2-naphthoate and 4 mol percent thereto of cadmium iodide was heated at 380° C. for 4 hours in pressurized gaseous carbon dioxide atmosphere of 30 kg/cm². Thus 8.27 kg of a rearrangement reaction product was obtained. The product was dissolved in 18.00 liters of water and heated for an hour under stirring, cooled to room temperature, and filtered to be removed of 2.77 kg of naphthalene and 0.35 kg of carbide and catalyst. The filtrate was treated with 65 g of active carbon, placed in an evaporator, and concentrated until 14.63 liters of water was distilled off. Thus (a) 3.90 kg of crystalline dipotassium naphthalene-2,6-dicarboxylate and (b) filtrate were obtained. The crystals (a) was put in a reactor provided with a gas inlet pipe and a stirrer, added with 22 liters of water, and reacted at room temperature and atmospheric pressure under stirring, while gaseous carbon dioxide was introduced thereinto for 2 hours. The system was filtered. Thus (c) 2.85 kg of crystalline monopotassium naphthalene-2,6-dicarboxylate and (d) filtrate were obtained. The solid product (c) was put in an evaporator equipped with a stirrer, added with 54 liters of water, and heated at 100° C. for 2 hours under stirring to effect disproportionation reaction. The system was then hot-filtered to be separated into (f) cake and (e) filtrate. The cake (f) was further washed with 1.5 liters of hot water and dried. Thus 1.35 kg of the object naphthalene-2,6-dicarboxylic acid was obtained. The filtrate (e) was combined with the washing, and recycled for dissolving the crystalline dipotassium naphthalene-2,6-dicarboxylate (a') produced in the next run.

The naphthalene-2,6-dicarboxylic acid had a purity of 99.4 percent, and the optical density of its 1:1 aqueous ammonia solution at 400 m$\mu$ was 0.005. The product could be directly reacted with ethylene glycol to produce high quality polyethylene 2,6-naphthalenedicarboxylate.

The filtrates (b) and (d) were combined, added with 2-naphthoic acid and cadmium iodide, and concentrated to dryness. The dry product was subjected to the rearrangement reaction under the same conditions as previously employed, and the reaction product was treated similarly to the foregoing, to produce naphthalene-2,6-dicarboxylic acid. Such recirculative operations were repeated 10 times.

In all runs the purity of resulting naphthlene-2,6-dicarboxylic acid was 99.4–99.6 percent, and the optical density of its aqueous ammonia solution at 400 m$\mu$ ranged 0.005–0.006.

EXAMPLE 5

To a mixture of potassium 1-naphthoate and potassium 2-naphthoate, 4 mol percent to the potassium salts of cadmium iodide was added, and the mixture was heated at 380° C. for 4 hours in pressurized gaseous carbon dioxide atmosphere of 30 kg/cm². The resulting rearrangement reaction product was dissolved in water and the insoluble matters in warm water were filtered off. The filtrate was decolorized with active carbon. Thus 100 kg of aqueous solution of crude dipotassium naphthalene-2,6-dicarboxylate was obtained, which contained 18.5 kg of dipotassium naphthalene-2,6-dicarboxylate and 1.5 kg of other potassium salts of naphthalenecarboxylic acids. The purity of said dipotassium naphthalene-2,6-dicarboxylate was 92.4 weight percent.

To said 100 kg of aqueous solution 20 weight percent aqueous solution of potassium hydrogencarbonate was added, mixed in an evaporator and concentrated. The solid cake formed was recovered by filtration at 80°–90° C. with the following results:

TABLE 4

| Weight of 20 wt. % KHCO₃ Aqueous Solution (kg) | Degree of Concentration (%)* | Yield (%) | Purity of Precipitate (%) |
|---|---|---|---|
| 30 | 50 | 95.0 | 99.7 |
| 41 | 45 | 99.0 | 99.6 |

*Definition of the term is already given in the specification.

The similar data on the cake obtained through identical procedures with above, except that the addition of potassium hydrogencarbonate was omitted, are given in Table 4' below.

TABLE 4'

| Degree of Concentration (%) | Yield (%) | Purity of Precipitate (%) |
|---|---|---|
| 50 | 70 | 99.6 |
| 60 | 81 | 99.4 |
| 75 | 91 | 96.0 |

17.4 kilograms of dipotassium naphthalene-2,6-dicarboxylate obtained through the identical mixture concentration step under addition of potassium hydrogencarbonate as above, was formed into a 15 weight percent aqueous solution, decolorized with active carbon, and maintained at 20° C. while gaseous carbon dioxide was introduced thereinto for an hour. Thus formed white precipitate was filtered, which was identified to be a cake of monopotassium naphthalene-2,6-dicarboxylate. The cake was formed into an aqueous slurry of 5 weight percent concentration, and heated under reflux for an hour to be disproportionated. The cake obtained by hot-filtering the resulting white precipitate was naphthalene-2,6-dicarboxylic acid, which weighed 5.3 kg. The purity of the acid was 99.9 percent, and the optical density of its 1:1 aqueous ammonia solution at 400 mμ was 0.002.

EXAMPLE 6

To 100 kg of the aqueous solution of crude dipotassium naphthalene-2,6-dicarboxylate obtained by the same procedures as employed in Example 5, 99 kg of the mother liquor obtained of the carbon dioxide reaction step of Example 5 from which the white precipitate had been filtered off, was added, mixed in an evaporator and concentrated. At the degree of concentration of 53 percent, the precipitation yield was 96 percent, and purity of the precipitate was 99.5 percent.

Also, 250 kg of the filtrate (mother liquor) obtained of the disproportionation reaction of Example 5 was added to dipotassium naphthalene-2,6-dicarboxylate, and concentrated to a 15 weight percent aqueous solution. The solution was decolorized, and into which gaseous carbon dioxide was introduced for an hour at 20° C., under stirring. The cake obtained by filtering the resulting white precipitate was formed into a 5weight percent aqueous slurry, which was disproportionated by heating under reflux for an hour. 8.1 kilograms of the solid cake obtained by hot-filtering the system was naphthalene-2,6-dicarboxylic acid. The product had a purity of 99.9 percent, and the optical density of its 1:1 aqueous ammonia solution at 400 mμ was 0.003.

EXAMPLE 7

The operation cycle of four steps of rearrangement reaction, mixture concentration, carbon dioxide reaction and disproportionation reaction, and three recycling systems as illustrated in FIG. 2 was repeated nine times. The results were as follows: Per 20 kg of crude dipotassium naphthalene-2,6-dicarboxylate remaining after removing the insoluble matters in warm water from the rearrangement reaction product, 12.6 kg of naphthalene-2,6-dicarboxylic acid was obtained at the ninth run. In all runs the purity of the product was 99.9 percent, and the optical density of its 1:1 aqueous ammonia solution at 400 mμ ranged 0.002–0.004. The naphthalene-2,6-dicarboxylic acid was directly polymerized with ethylene glycol. Whereby polyethylene naphthalene-2,6-dicarboxylate having equal whiteness with that of polyethylene terephthalate from directly polymerizable terephthalic acid was obtained.

We claim:

1. A process for the preparation of naphthalene-2,6-dicarboxylic acid, which comprises
   i. dissolving a rearrangement reaction product containing a dialkali salt of naphthalene-2,6-dicarboxylic acid in water;
   ii. filtering off insoluble matter from the resulting solution;
   iii. concentrating the remaining solution to a degree that the precipitation yield of the dialkali salt precipitated when the concentrated liquid is cooled to room temperature reaches at least 70 percent by weight and the purity of said precipitated dialkali salt exceeds 97 percent, and separating the resulting precipitate;
   iv. forming an aqueous solution of said precipitate;
   v. passing gaseous carbon dioxide through the formed aqueous solution to precipitate a monoalkali salt of naphthalene-2,6-dicarboxylic acid, and separating the precipitate;
   vi. heating the precipitated monoalkali salt of naphthalene-2,6-dicarboxylic acid in water or water-containing organic solvent, thereby causing disproportionation thereof into (A) naphthalene-2,6-dicarboxylic acid, and (B) the dialkali salt of naphthalene-2,6-dicarboxylic acid;
   vii. separating the precipitated naphthalene-2,6-dicarboxylic acid from the mother liquor; and
   viii. recycling the mother liquor containing (B) into step (v).

2. The process of claim 1, wherein said mother liquor remaining after recovery of the precipitate from the concentrated liquid containing the rearrangement reaction product and the mother liquor remaining after recovery of the precipitate from the carbon dioxide reaction system are combined and recycled into the step for preparation of the starting material of the rearrangement reaction.

3. The process of claim 1, wherein said mother liquor remaining after recovery of the precipitate from the concentrated liquid containing the rearrangement reaction product is recycled into the step for preparation of the starting material of the rearrangement reaction, and the mother liquor containing the alkali carbonate or bicarbonate remaining after recovery of the precipitate from the carbon dioxide reaction system is recycled into the mixture concentration step.

4. A process for the preparation of napthalene-2,6-dicarboxylic acid, which comprises
   i. dissolving a rearrangement reaction product containing a dialkali salt of naphthalene-2,6-dicarboxylic acid in water;
   ii. filtering off insoluble matter from the resulting solution;
   iii. concentrating the remaining solution to a degree that the precipitation yield of the dialkali salt precipitated when the concentrated liquid is cooled to room temperature reaches at least 70 percent by weight and the purity of said precipitated dialkali salt exceeds 97 percent, and separating the resulting precipitate;
   iv. forming an aqueous solution of said precipitate;
   v. adding a naphthalene-di- or monocarboxylic acid other than naphthalene-2,6-dicarboxylic acid to the formed aqueous solution to precipitate a monoalkali salt of naphthalene-2,6-dicarboxylic acid, and separating the precipitate;

vi. heating the precipitated monoalkali salt of naphthalene-2,6-dicarboxylic acid in water or water-containing organic solvent, thereby causing disproportionation thereof into (A) naphthalene-2,6-dicarboxylic acid, and (B) the dialkali salt of naphthalene-2,6-dicarboxylic acid;

vii. separating the precipitate naphthalene-2,6-dicarboxylic acid from the mother liquor; and viii. recycling the mother liquor containing (B) into step (v).

* * * * *